United States Patent
Fukuhara et al.

(10) Patent No.: US 7,590,294 B2
(45) Date of Patent: Sep. 15, 2009

(54) IMAGE COMPRESSION APPARATUS AND METHOD, AND PROGRAM AND RECORDING MEDIUM

(75) Inventors: Takahiro Fukuhara, Kanagawa (JP); Katsutoshi Ando, Tokyo (JP)

(73) Assignee: Sony Corporation, Tokyo (JP)

( * ) Notice: Subject to any disclaimer, the term of this patent is extended or adjusted under 35 U.S.C. 154(b) by 742 days.

(21) Appl. No.: 11/280,327

(22) Filed: Nov. 17, 2005

(65) Prior Publication Data
US 2006/0126948 A1   Jun. 15, 2006

(30) Foreign Application Priority Data
Nov. 29, 2004   (JP)   ............... 2004-344795

(51) Int. Cl.
*G06K 9/36* (2006.01)
(52) U.S. Cl. ...................... 382/232; 382/236
(58) Field of Classification Search ............... 382/232, 382/233, 236, 239, 199; 370/493, 503, 536; 348/143, 156; 375/240, E7.04, E7.199; 386/68, 386/117; 710/62
See application file for complete search history.

(56) References Cited
FOREIGN PATENT DOCUMENTS

| | | |
|---|---|---|
| JP | 11-110300 | 4/1999 |
| JP | 2004-112425 | 4/2004 |
| JP | 2004-228680 | 8/2004 |
| JP | 2004-336593 | 11/2004 |

*Primary Examiner*—Anh Hong Do
(74) *Attorney, Agent, or Firm*—Oblon, Spivak, McClelland, Maier & Neustadt, L.L.P.

(57) ABSTRACT

An image compression apparatus and method which compression-encode an input moving image signal according to a JPEG2000 system and record the acquired encoded code stream in an MXF file, are provided. The image compression apparatus includes an encoding unit that compression-encodes each frame constituting an input moving image signal according to a JPEG2000 system to generate an encoded code stream for each frame, a file header generating unit that temporarily generates a file header of the MXF and records at least information for identifying a JPEG2000 system and size information of each encoded code stream generated by the encoding unit in the file header, a file body generating unit that records each encoded code stream generated by the encoding unit in the file body of the MXF, and a file generating unit that generates an MXF file at least from the data recorded in the file header and the data recorded in the file body.

23 Claims, 16 Drawing Sheets

| Byte length | Types of parameter |
|---|---|
| 16 | J2K essence descriptor UL |
| 4 | Length |
| 16 | Instance UID |
| 8 | Sample rate |
| 16 | Essence container UL |
| 1 | Frame layout |
| 4 | Stored width |
| 4 | Stored heigth |
| 8 | Aspect ratio |
| 8 | Video line map |
| 16 | Picture essence coding |
| 2 | Rsize |
| 4 | Xsize |
| 4 | Ysize |
| 4 | X0size |
| 4 | X0size |
| 4 | XTsize |
| 4 | YTsize |
| 4 | XT0size |
| 4 | YT0size |
| 20 | Image components |

FIG.3

| Item name | Type | Local tag | Byte length |
|---|---|---|---|
| Index Table Segment | Set Key | --- | 16 |
| Length | BER Length | --- | var |
| Instant ID | UUID | 3C0A | 16 |
| Index Edit Rate | Rational | 3F0B | 8 |
| Index Start Position | Position | 3F0C | 8 |
| Index Duration | Length | 3F0D | 8 |
| Edit Unit Byte Count | UINT32 | 3F05 | 4 |
| Index SID | UINT32 | 3F06 | 4 |
| Body SID | UINT32 | 3F07 | 4 |
| Slice Count | UINT8 | 3F08 | 1 |
| Index Entry Array | Array of Index Entry | 3F0A | Variable length |

FIG.4

| N | Item name | Type | Byte length |
|---|---|---|---|
| 1 | NIE (Number of Index Entries) | UINT32 | 4 |
| 1 | Length | UINT32 | 4 |
| NIE | Temporal Offset | INT8 | 1 |
| | Key-Frame Offset | INT8 | 1 |
| | Flags | Edit Unit Flag | 1 |
| | Stream Offset | UINT64 | 8 |

| Frame 0 (1000 Bytes) | Frame 1 (2000 Bytes) | Frame 2 (1000 Bytes) | Frame 3 (3000 Bytes) | Frame 4 (1000 Bytes) |

FIG.11B

| Frame 0 (1000 Bytes) | Frame 1 (2000 Bytes) | Frame 2 (1500 Bytes) | Frame 3 (3000 Bytes) | Frame 4 (1000 Bytes) |

FIG.11C

| Frame 0 (1000 Bytes) | Frame 1 (2000 Bytes) | Frame 2 (1500 Bytes) | Frame 3 (1000 Bytes) | Frame 4 (1500 Bytes) |

IMAGE COMPRESSION APPARATUS AND METHOD, AND PROGRAM AND RECORDING MEDIUM

CROSS REFERENCES TO RELATED APPLICATIONS

The present invention contains subject matter related to Japanese Patent Application JP 2004-344795 filed in the Japanese Patent Office on Nov. 29, 2004, the entire contents of which being incorporated herein by reference.

BACKGROUND OF THE INVENTION

1. Field of the Invention

The present invention relates to an image compression apparatus and method as well as a program and a recoding medium which generate an encoded code stream for each frame by compression-encoding each frame constituting an input moving image signal and which record each encoded code stream in a file body in a file.

2. Description of the Related Art

The MXF standardized by the SMPTE is registered with a number of SMPTE 377M. This document can be acquired by anyone, and its contents can be confirmed. The MXF is originally a file format for transmission for the purpose of exchanging the material of a program. As the Internet prevails, the needs for transferring and sharing a file placed in a server on the network with other clients are increased. What is important in this case is a file exchange format and an IP network. The maintenance of the compatibility of the file becomes important. In view of the above circumstances, it becomes necessary to introduce a flexible and open file format. Thus, the MXF is standardized. The MXF has good extendability. Accordingly, the MXF file for MPEG (Moving Picture Experts Group) 2 system of an ISO international dynamic image compression standard is defined. (Refer to non-patent reference 1: http://www.smpte.org/engineering-.committees/trialpub.cfm).

SUMMARY OF THE INVENTION

The JPEG2000 system of the ISO international static image compression standards employs a system that combines high efficient entropy encoding (bit modeling of bit plane unit and arithmetic encoding) with a wavelet transformation. Thus, as compared with a conventional JPEG system, the encoding efficiency is remarkably improved. Further, even a Motion-JPEG2000 system which compresses each frame of a moving image according to the JPEG2000 system has great advantages as compared with the MPEG2 system in easiness of editing and scalability or compatibility with the network.

Then, it is considered that the encoded code stream compressed according to the JPEG2000 system is recorded in the above-mentioned MXF file. However, such a technology has not been proposed.

The present invention is proposed in view of such circumstances. It is desirable to provide an image compression apparatus and method as well as a program and a recording medium which compression-encodes an input moving image signal according to a JPEG2000 system and records the acquired encoded code stream in an MXF file.

According to the present invention, there is provided an image compression apparatus which includes an encoding means for compression-encoding each frame constituting an input moving image signal according to a JPEG2000 system to generate an encoded code stream, a file header generating means for temporarily generating a file header of the MXF and recording at least information for identifying a JPEG2000 system and size information of each encoded code stream generated by the encoding means in the file header, a file body generating means for recording each encoded code stream generated by the encoding means in a file body of the MXF, and a file generating means for generating an MXF file at least from the data recorded in the file header and the data recorded in the file body.

Further, according to the present invention, there is also provided an image compression method which includes an encoding step of compression-encoding each frame constituting an input moving image signal according to the JPEG2000 system to generate an encoded code stream for each frame, a file header generating step of temporarily generating a file header of the MXF and recording at least information for identifying the JPEG2000 system and size information of each encoded code stream generated by the encoding step in the file header, a file body generating step of recording each encoded code stream generated in the encoding step in a file body of the MXF, and a file generating step of generating an MXF file at least from the data recorded in the file header and the data recorded in the file body.

A program according to the present invention allows a computer to execute the above-mentioned image compression processing. A recording medium according to the present invention can be read by a computer in which such a program is recorded.

According to the present invention, since an input moving image signal is compression-encoded according to the JPEG2000 system, the acquired encoded code stream can be recorded in an MXF file, and output, the image compression apparatus and method as well as the program and the recording medium are useful, for example, for a digital cinema projector, a digital cinema server, a high resolution image camera, a medical image device, a satellite image distribution apparatus or their software module, etc.

BRIEF DESCRIPTION OF THE DRAWINGS

FIG. 3 is a view showing an example describing information for identifying a JPEG2000 system in header metadata in a file header;

FIG. 4 is a view showing detailed configuration of an index table in the file header;

FIG. 5 is a view showing the detailed configuration of an "Index Entry Array" in the index table;

FIGS. 11A to 11C are views showing an example of re-encoding only part of the midway frame or all the frames from the midway frame after an input moving image signal is encoded;

DETAILED DESCRIPTION OF THE PREFERRED EMBODIMENTS

Figure 1:
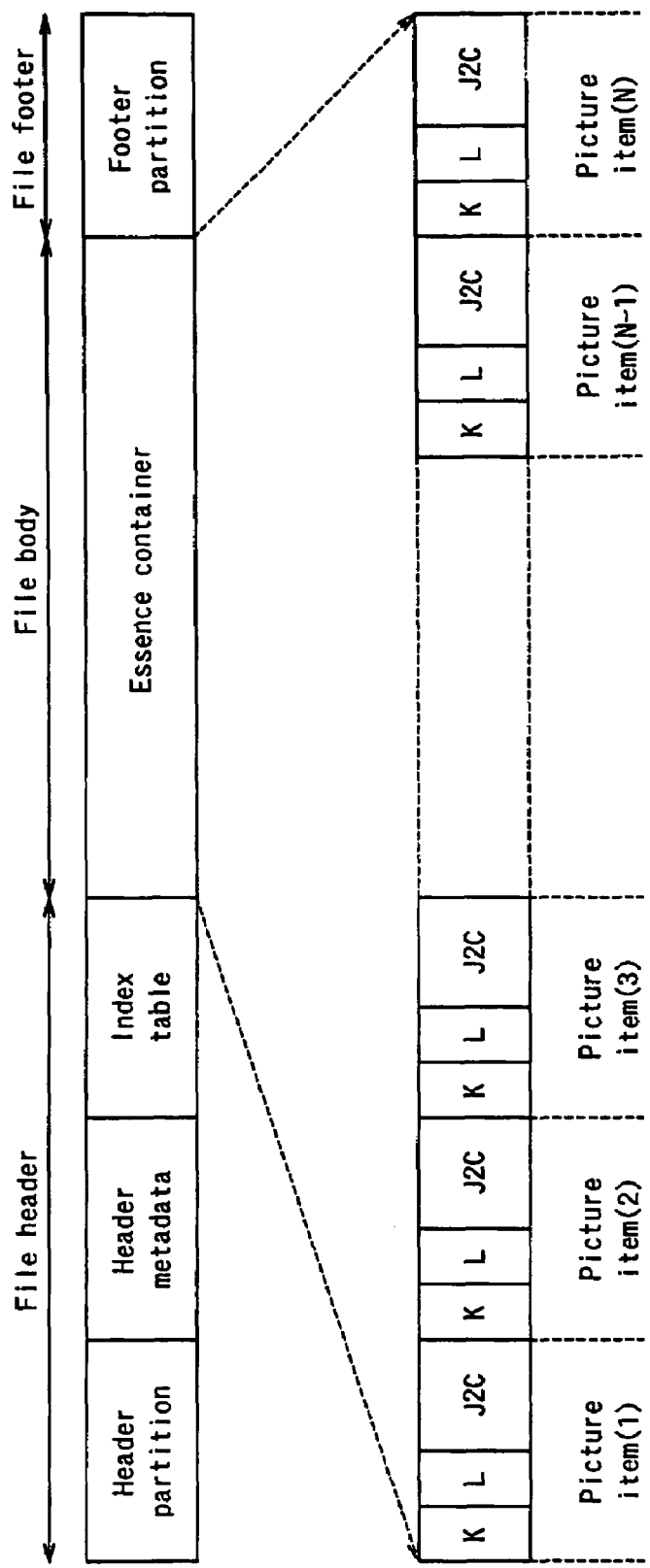
FIG. 1 is a view showing a format of an MXF file.

Embodiments of the present invention, will be described in detail by referring to the drawings. In the embodiments, the present invention is applied to the image compression apparatus that compression-encodes an input moving image signal according to the JPEG2000 system and records the acquired encoded code stream in an MXF file.

Here, the MXF file includes, as shown in FIG. 1, a file header, a file body, and a file footer. The file header is further disassembled into a header partition, header metadata and an index table. The file body is also called an essence container. In the file body, an encoded code stream for each frame acquired by encoding, is recorded as picture item. The file footer is also called a footer partition. Additional information is recorded in the file footer.

First Embodiment

Figure 2:
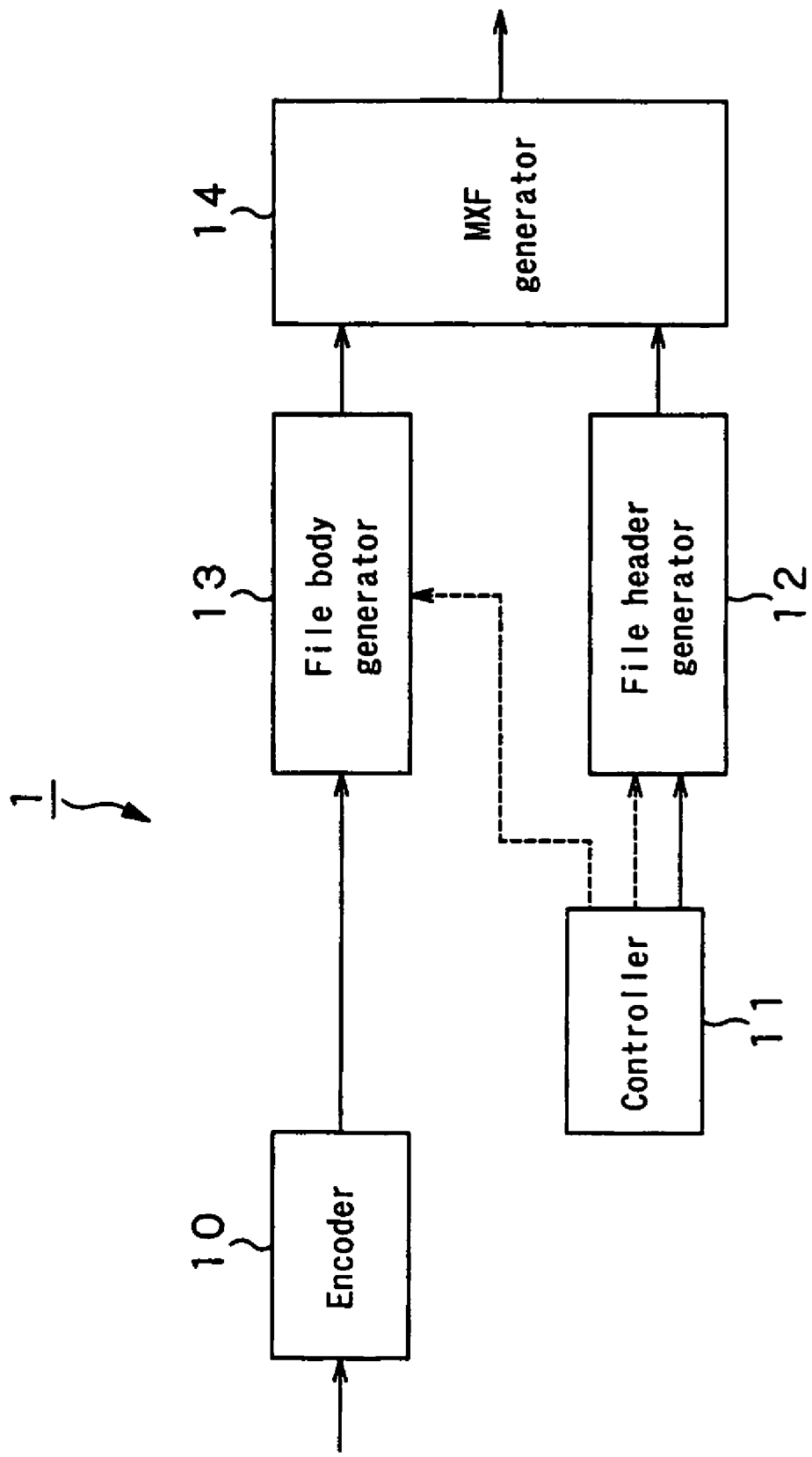
FIG. 2 is a view showing a schematic configuration of an image compression apparatus according to a first embodiment.

First, a schematic configuration of the image compression apparatus according to a first embodiment is shown in FIG. 2. As shown in FIG. 2, the image compression apparatus 1 of the first embodiment includes an encoder 10 that compression-encodes a static image according to a JPEG2000 system, a controller 11, a file header generator 12 that generates a file header of an MXF file, a file body generator 13 that generates a file body of the MXF file, and an MXF generator 14 that generates the final MXF file.

In the image compression apparatus 1, the encoder 10 compression-encodes an input moving image signal for each frame according to the JPEG2000 system, and supplies the generated encoded code stream for each frame to the file body generator 13.

The controller 11 mainly controls the file header generator 12 and the file body generator 13. The controller 11 supplies size information of the encoded code stream and information regarding the other JPEG2000 system to the file header generator 12.

The file header generator 12 temporarily generates a file header of an MXF file prior to the encoding in the encoder 10. In this temporary encoding, only the format determined at this time point and information regarding the other JPEG2000 system are filed. When the size information of the encoded code stream for one frame or predetermined number of frames is supplied from the controller 11, the file header generator 12 records the information in the file header to update the file header. That is, the actual body of the file header exists, for example, as a file on a hard disc (not shown). The file header generator 12 arbitrarily updates this file as needed.

More particularly, the file header generator 12 describes the information for identifying the JEPG2000 system in the header metadata of the file header according to "Annex-D D2.1 Generic Picture Essence Descriptor" of the MxF format document (SMPTE 377M).

An example of describing the information for identifying the JPEG2000 system in the table defined in the MXF format document is shown in FIG. 3. "J2K essence descriptor UL" at the beginning is information for proving to be the encoded code stream of the JPEG2000 system. Further, the frame rate at the time of encoding is described in a "Sample rate". For example, in the case of movies, 24 frames/sec are described. Further, in the "Aspect ratio", the aspect ratio of, for example, 3:2 is described. In the "Picture essence coding", JPEG2000 is described. Moreover, from "Rsiz" to "YTOsiz", each parameter in the SIZ marker segment defined in the JPEG2000 standards is described. Therefore, by reading the information from "Rsiz" to "YTOsiz", important information, such as horizontal/vertical sizes of the input image, a size of encoded tile, etc., can be detected.

Furthermore, the file header generator 12 describes the size information of the encoded code stream using the offset value defined in the index table of the file header. The detailed configuration of the index table is shown in FIG. 4. An item of variable length of "Index Entry Array" is defined in the index table. As shown in FIG. 5, in this "Index Entry Array", an offset value of a "Stream Offset" is defined. The file header generator 12 describes the size information of the encoded code stream using the value of this "Stream Offset".

Figure 6:
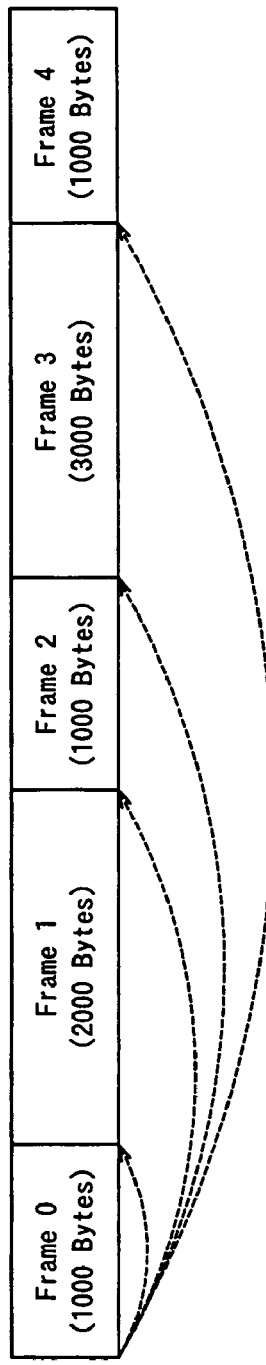
FIGS. 6A and 6B are views showing an example of values of "Stream Offset" at the time of actually encoding five frames.

One example of the values of the "Stream Offset" at the time point of actually encoding 5 frames from the frame 0 to the frame 4 is shown in FIGS. 6A and 6B. As shown in FIG. 6A, if it is assumed that the sizes of the encoded code streams of the frames 0 to 4 are respectively 1000 bytes, 2000 bytes, 1000 bytes, 3000 bytes and 1000 bytes, the value of the "Stream Offset" for each frame becomes the value obtained by adding the size to the frame immediately before as shown in FIG. 6B. Thus, when accessing to the head data of arbitrary frame, it is understood from which byte number it is jumped from the head of the data.

Then, when the encoding of all the frames is finished in the encoder 10, the file header generator 12 determines the contents of the file header, and supplies the data in the file header generator 12 to the MXF generator 14.

The file body generator 13 records the encoded code stream supplied from the encoder 10 in the file body for each frame. When the encoding of all the frames is finished in the encoder 10, the file body generator 13 supplies the data in the file body generator 13 to the MXF generator 14.

When the data are supplied from the file header generator 12 and the file body generator 13, the MXF generator 14 generates the final OF file and outputs the final MXF file.

Figure 7:
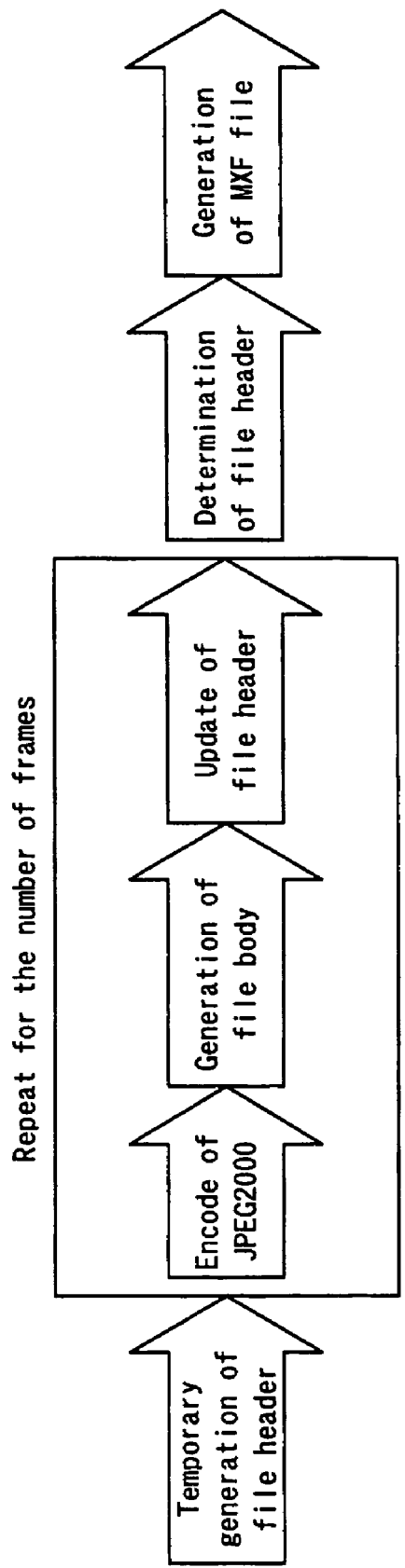
FIG. 7 is a view showing a flow of a process of the image compression apparatus according to the first embodiment.

The flow of the process of the image compression apparatus 1 as described above is shown in FIG. 7. First, the file header generator 12 temporarily generates a file header and records the format determined at that time point and the information regarding the other JPEG2000 system. Thereafter, the encoder 10 sequentially encodes each frame of the input moving image signal. The file body generator 13 records the encoded code stream generated each time the encoding of one frame is, for example, finished, in the file body. To describe the size information of the encoded code stream, the file header generator 12 updates the value of the "Stream offset" in the index table. When the encoding of all the frames is finished, the file header generator 12 determines the file header. The MXF generator 14 generates and outputs the final MXF file. Incidentally, the file header may be updated not for each frame but for a predetermined number of frames, as described above.

As described above, the image compression apparatus 1 according to the embodiment compression-encodes an input moving image signal according to the JPEG2000 system, records the obtained encoded code stream in the MXF file and outputs it. Particularly, the image compression apparatus 1 updates the file header each time the encoding of one frame or a predetermined number of frames is finished. Accordingly, even when the system is crushed in the process of generating the MXF file while compression-encoding an input moving image signal which is very long (for example, about 17000 frames in a movie of 2 hours), the latest file header always exists. Restart from the middle can be easily performed. A memory for storing values of the "Stream offset" is not required as well.

Incidentally, in the foregoing description, it is described that an MXF file is generated from one input moving image signal. However, as will be described below, a plurality of MXF files having different resolutions may be generated from one input moving image signal.

Figure 8:
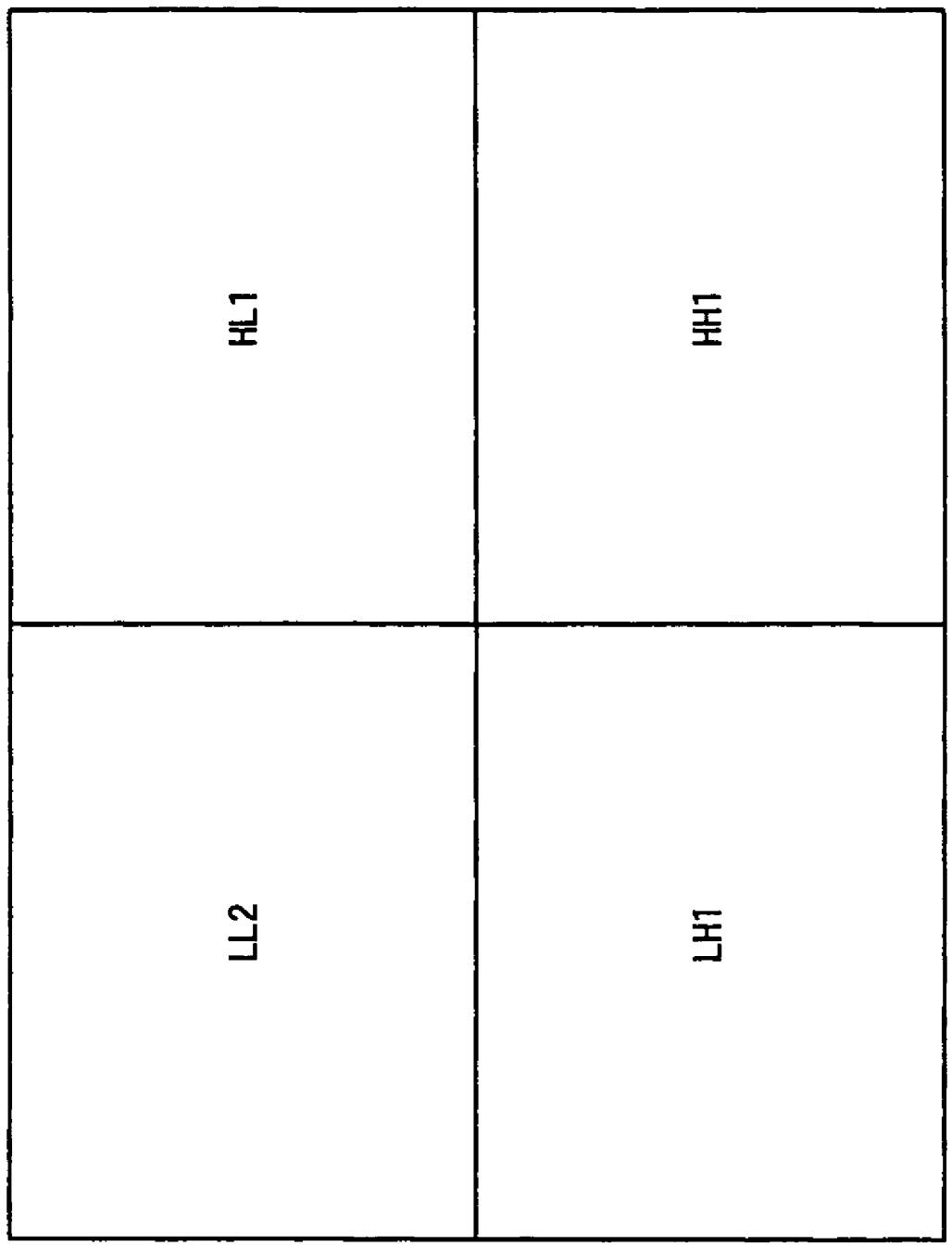
FIG. 8 is a view showing a subband formed when a wavelet transformation is executed once in horizontal and vertical directions.

As an example, assuming that the wavelet transformation is performed once in horizontal and vertical directions and that four subbands are formed as shown in FIG. 8. In FIG. 8, L and H respectively denote low frequency and high frequency, and numbers after the L and H designate dividing levels. That is, for example, LH1 represents a dividing level=subband of 1 of low frequency in a horizontal direction and of high frequency in a vertical direction. In this case, for example, in addition to the MXF file using all the subbands of LH1, HL1, HH1, and LL2 similar to the above description, an MXF file using only the subband of LL2 can be generated. Thus, the MXF file having the resolution according to the size of a screen, etc., can be selected. Further, there may be generated the MXF file using only the subband of LL2 and the MXF file using the subbands of LH1, HL1 and HH1. In this case, an image of the original resolution can be reproduced by using the two MXF files.

The generation of the two MXF files which can reproduce images with the resolutions of two stages has been described. However, the present invention is by no means limited thereto. A plurality of the MXF files which can reproduce images with the resolutions of three or more stages can be generated.

Second Embodiment

Figure 9:
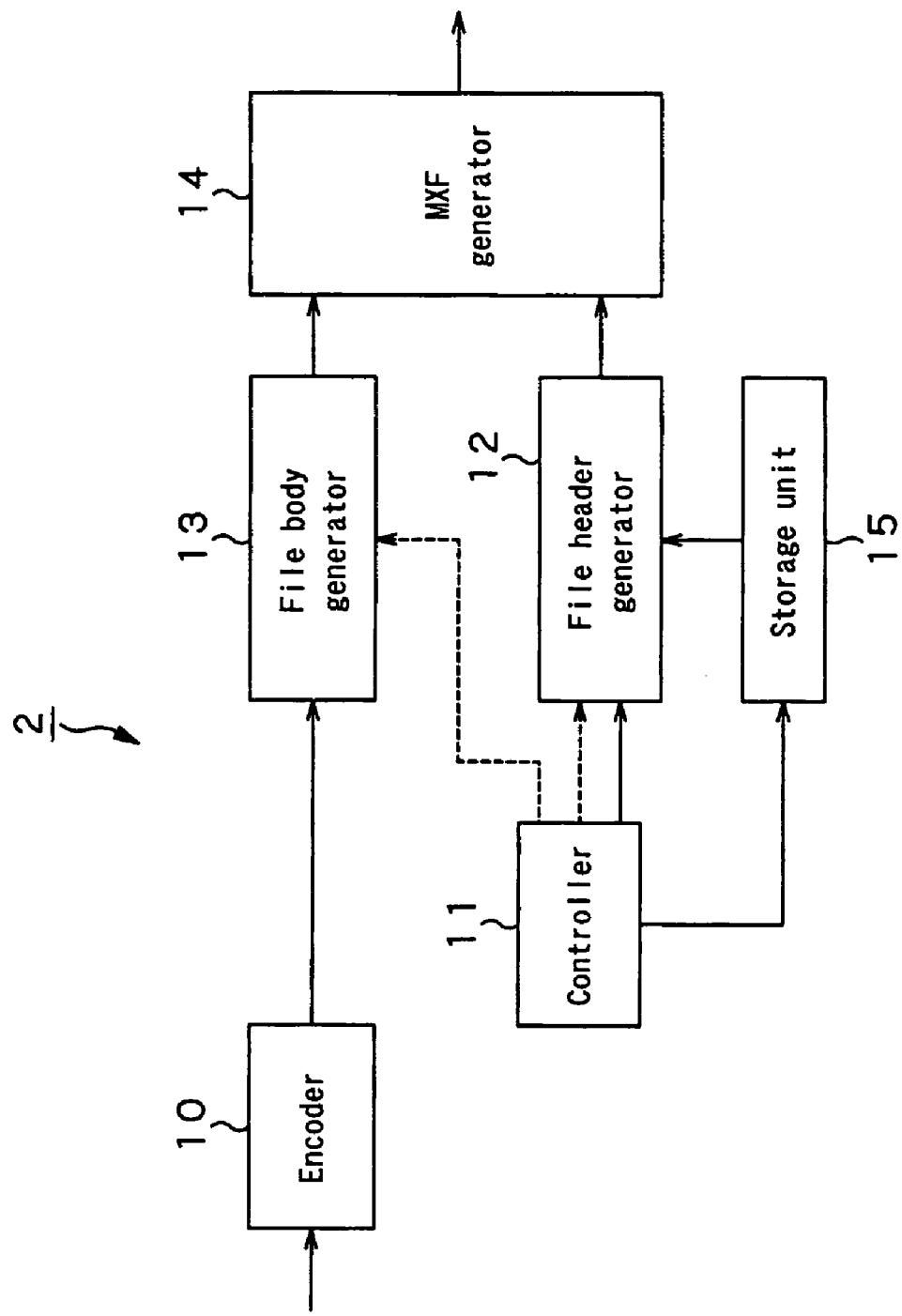
FIG. 9 is a view showing the schematic configuration of the image compression apparatus according to a second embodiment.

An image compression apparatus 2 shown in FIG. 9 according to a second embodiment has a basic configuration similar to the image compression apparatus 2 shown in FIG. 2. However, the image compression apparatus 2 has a storage unit 15, and has a feature that the storage unit 15 stores value of the "Stream offset" of each frame until the encoding of all the frames is finished. Therefore, the configuration similar to that of the image compression apparatus 1 shown in FIG. 2 are denoted by the same reference numerals and the detailed description will be omitted.

Figure 10:
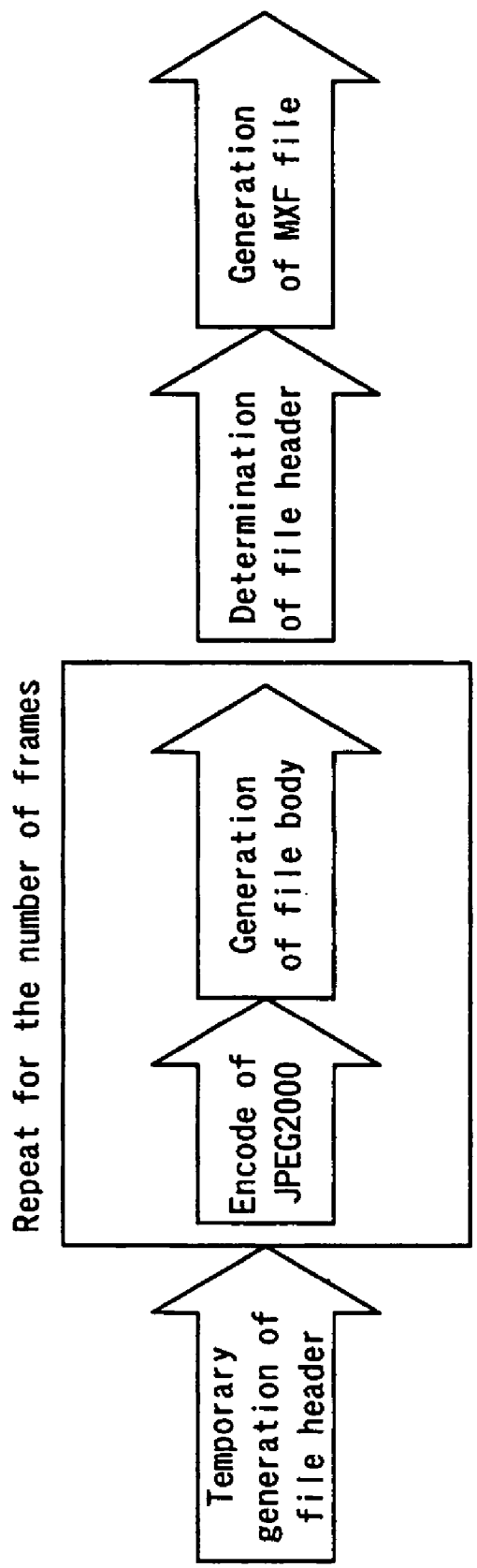
FIG. 10 is a view showing the flow of the process of the image compression apparatus according to the second embodiment.

The flow of the process of this image compression apparatus 2 is shown in FIG. 10. First, the file header generator 12 temporarily generates a file header and records the format decided at the time of the temporary generation and information regarding the other JPEG2000 system. Thereafter, the encoder 10 sequentially encodes each frame of the input image information. The file body generator 13 records the encoded code stream generated each time the encoding of one frame is finished in the file body. The file header generator 12 stores the values of the "Stream offset" describing the size information of the encoded code stream in the storage unit 15. When the encoding of all the frames is finished, the file header generator 12 records the values of the "Stream offset" stored in the storage unit 15 in the file header. Then, the file header generator 12 determines the file header. The MXF generator 14 generates the final MXF file and outputs the OF file.

As described above, according to the image compression apparatus 2 of this embodiment, each time encoding of one frame is finished, the values of the "Stream offset" are stored in the storage unit 15. At the time of finishing the encoding of all the frames, the values of the "Stream offset" are recorded in the file header. Accordingly, it is not necessary to sequentially update the file header as the first embodiment. The process is alleviated. Further, in fact, a storage capacity necessary to hold the values of the "Stream offset" is, in the case of a moving image of one hour, Local tag: 4×8+2=34 bytes
Index item: 16+4+16+8+8+8+4+4+4+1=73 bytes
Index entry: 4+4+(1+1+1+8)×24×60×60=950408 bytes of total of 34+73+950408=about 950515 bytes.

Third Embodiment

After an input moving image signal is encoded, there may frequently occur the case that only part of the midway frame or all from the midway frame are encoded.

Then, the image compression apparatus of a third embodiment updates the encoded code stream recorded in the file body and the values of the "Stream offset" in the index table in the case of re-encoding to correct the MXF file which has already been determined.

For example, as shown in FIG. 11A, it is assumed that the sizes of the encoded code streams of frames 0 to 4 are 1000 bytes, 2000 bytes, 1000 bytes, 3000 bytes and 100 bytes, respectively. As a result that only the frame 2 is re-encoded, as shown in FIG. 11B, when the size of the encoded code stream of the frame 2 becomes 1500 bytes, the values of the "Stream offset" of the frames 3 and 4 in the index table are updated according to the size of encoded code stream after the re-encoding. Further, as a result that the frame after the frame 2 is re-encoded, as shown in FIG. 11C, even when the sizes of the encoded code streams of the frames 2, 3, and 4 respectively become 1500 bytes, 1000 bytes, and 1500 bytes, the values of the "Stream offset" of the frames 3 and 4 in the index table are updated according to the sizes after the re-encoding.

Figure 12:
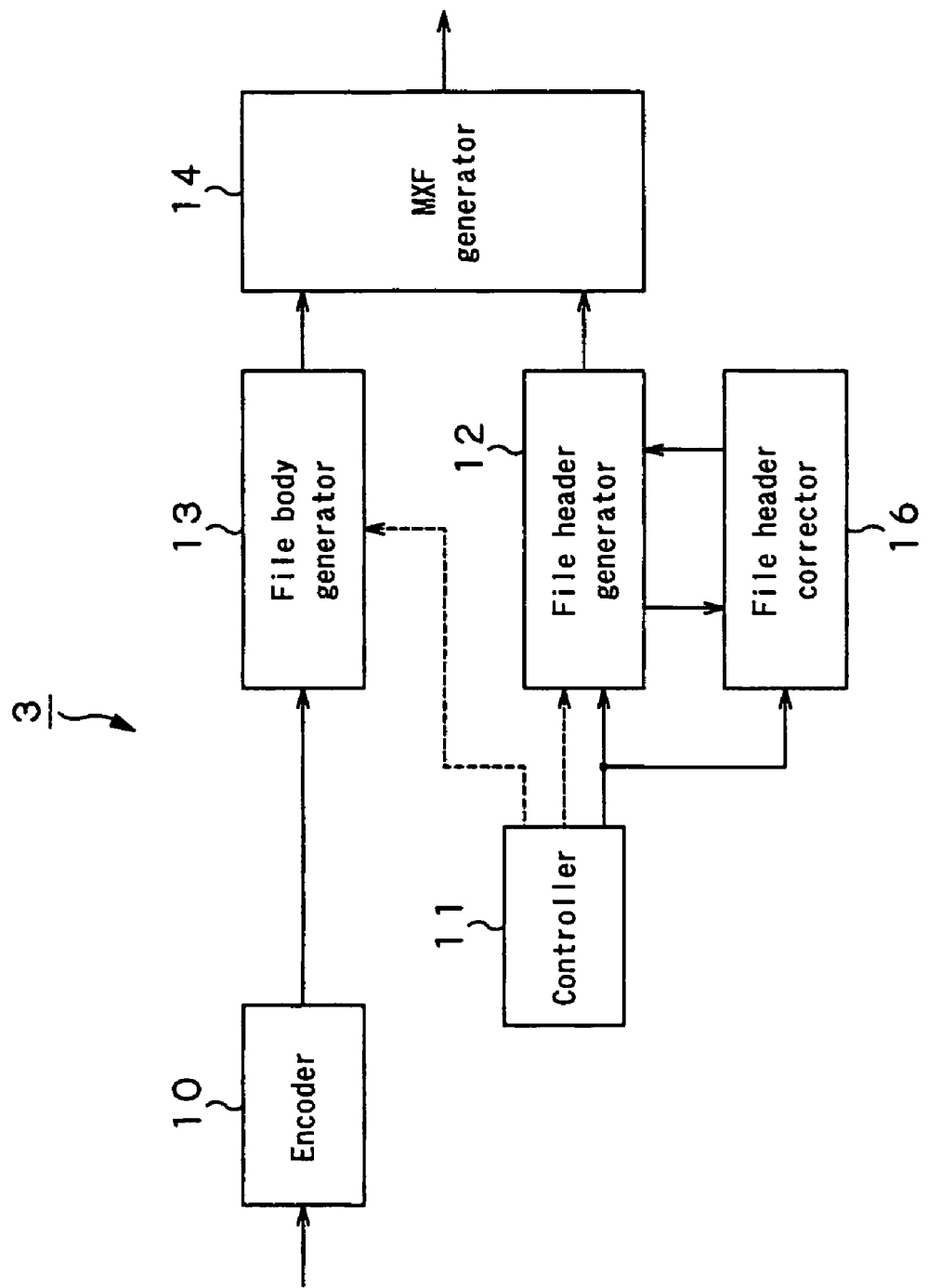
FIG. 12 is a view showing a schematic configuration of the image compression apparatus when the file header is sequentially updated according to a third embodiment.
Figure 13:
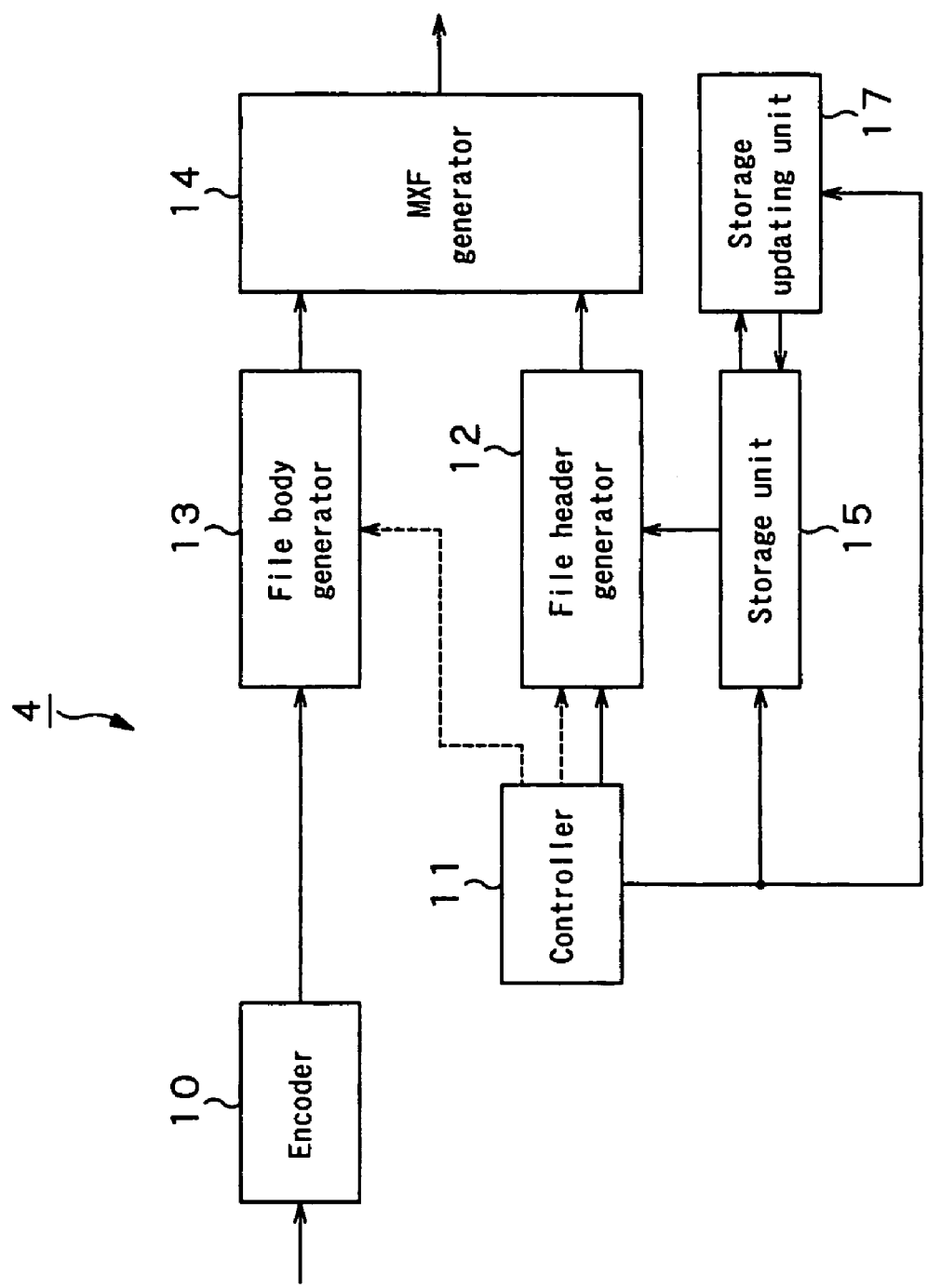
FIG. 13 is a view showing a schematic configuration of the image compression apparatus when the values of the "Stream offset" of all the frames are stored according to the third embodiment.

This re-encoding can be applied to the case that the file header is sequentially updated like in the first embodiment and the case that the values of the "Stream offset" of all the frames are stored according to the second embodiment. FIG. 12 shows a schematic configuration of the image compression apparatus 3 of the former case. FIG. 13 shows a schematic configuration of the image compression apparatus 4 of the latter case. In both cases, the configurations similar to those of the image compression apparatuses 1 and 2 shown in FIG. 2 and FIG. 9 are denoted by the same reference numerals and the detailed description will be omitted.

First, the image compression apparatus 3 will be described.

For example, after all the frames of the input moving image signal are encoded, when only N-th frame is re-encoded, the file header generator 12 supplies the values of the "Stream offset" except the N-th frame to a file header corrector 16, and holds it in the file header corrector 16. The encoder 10 re-encodes the N-th frame. The controller 11 supplies the size information of the encoded code stream of the N-th frame to the file header corrector 16. The file header corrector 16 corrects the values of the "Stream offset" after the (N+1)-th frame according to the supplied size information, and supplies the values of the "Stream offset" of all the frames after the correction to the header generator 12. The file header generator 12 records the values of the "Stream offset" to the file header, determines the file header and supplies the data in the file header generator 12 to the MXF generator 14.

On the other hand, when all the frames after the N-th frame are re-encoded after all the frames of the input moving image signal are encoded, the file header generator 12 supplies the values of the "Stream offset" up to the (N−1)-th frame to the file header corrector 16, and holds it in the file header corrector 16. The encoder 10 re-encodes the frames after the N-th frame. The controller 11 supplies the size information of the encoded code stream after the N-th frame to the file header corrector 16. When the size information of the encoded code stream of the last frame is supplied, the file header corrector 16 supplies the values of the "Stream offset" of all the frames to the file header generator 12. The file header generator 12 records the values of the "Stream offset" in the file header. The file header generator 12 determines the file header. The data in the file header generator 12 is supplied to the MXF generator 14.

The image compression apparatus 4 will be described.

For example, when only the N-th frame is re-encoded after all the frames of the input moving image signal are encoded, the storage unit 15 supplies the values of the "Stream offset" except the N-th frame to a storage updating unit 17, and holds it in the storage updating unit 17. The encoder 10 re-encodes the N-th frame. The controller 11 supplies the size information of the encoded code stream of the N-th frame to the storage updating unit 17. The storage updating unit 17 updates the values of the "Stream offset" after the (N+1)-th frame according to the supplied size information, and supplies the values of the "Stream offset" of all the frames after the updating to the storage unit 15. The storage unit 15 supplies the values of the "Stream offset" to the file header generator 12. The file header generator 12 records the values of the "Stream offset" in the file header, and determines the file header. The file header generator 12 supplies the data in the file header generator 12 to the MXF generator 14.

On the other hand, when re-encoding frames after the N-th frame after all the frames of the input moving image signal are encoded, the storage unit 15 supplies the values of the "Stream offset" up to the (N−1)-th frame to the storage updating unit 17, and holds it in the storage updating unit 17. The encoder 10 re-encodes frames after the N-th frame. The controller 11 supplies the size information of the encoded code stream after the N-th frame to the storage updating unit 17. When the size information of the encoded code stream of the last frame is supplied, the storage updating unit 17 supplies the values of the "Stream offset" of all the frames to the storage unit 15. The storage unit 15 supplies the values of the "Stream offset" to the file header generator 12. The file header generator 12 records the values of the "Stream offset" in the file header, and determines the file header. The file header generator 12 supplies the data in the file header generator 12 to the MXF generator 14.

As described above, according to the image compression apparatuses 3 and 4 of the embodiment, after the input moving image signal is encoded, only part of the midway frame or all frames from the midway frame are re-encoded, only partial correction and update may be required. Accordingly, the processing time can be shortened.

Fourth Embodiment

Figure 14:
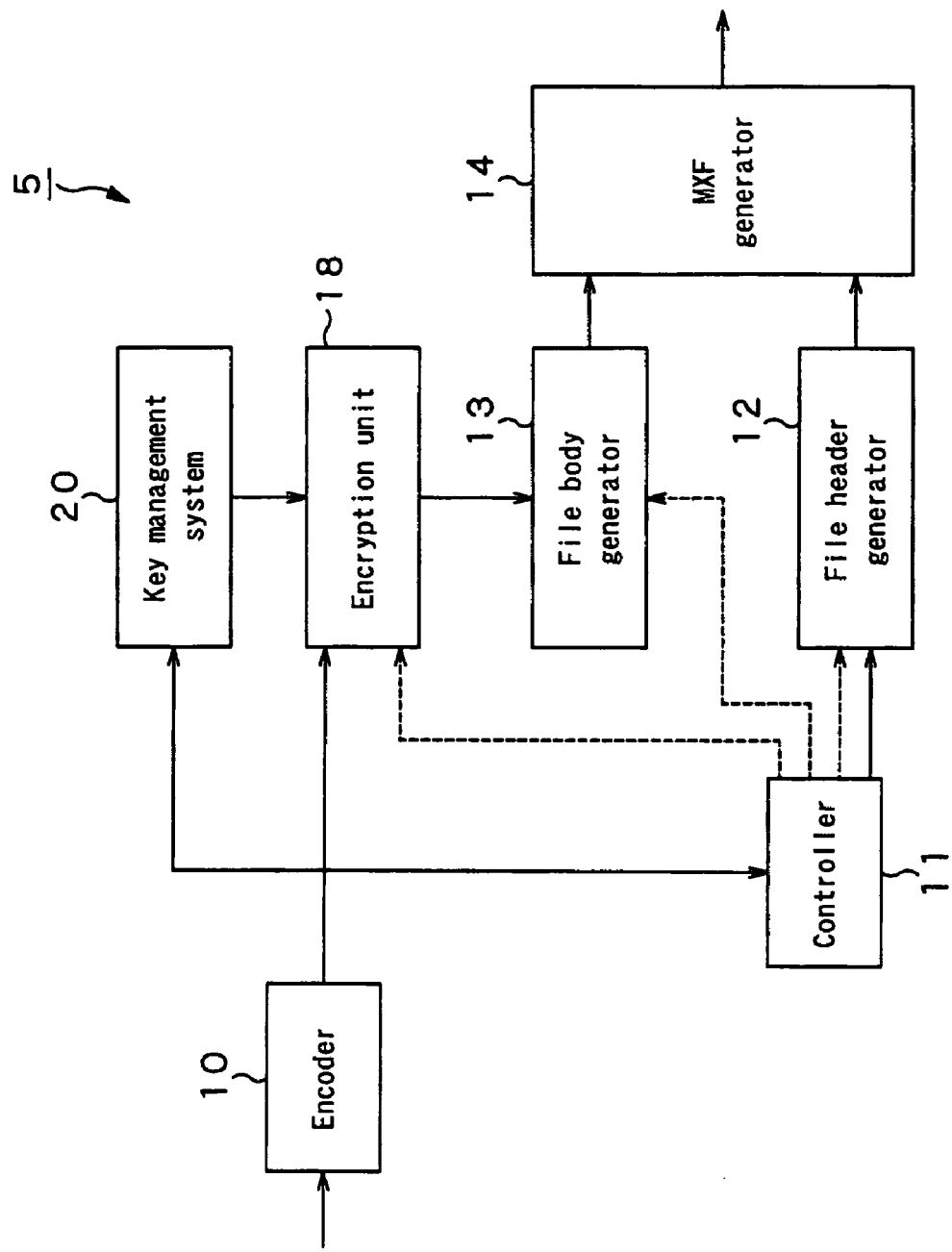
FIG. 14 is a view showing a schematic configuration of the image compression apparatus according to a fourth embodiment.

An image compression apparatus 5 shown in FIG. 14 as a fourth embodiment has a basic configuration similar to that of the image compression apparatus 1 shown in FIG. 2. However, the image compression apparatus 5 includes a feature that the apparatus 5 has an encryption unit 18, which encrypts the encoded code stream by a key acquired from a key management system 20. Therefore, the configuration similar to that of the image compression apparatus 1 shown in FIG. 2 are denoted by the same reference numerals and the detailed description will be omitted.

Figure 15:
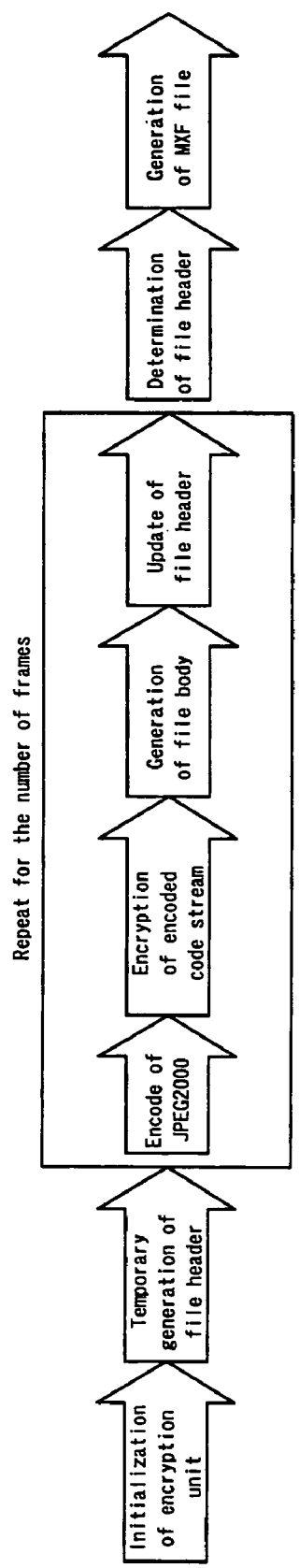
FIG. 15 is a view showing the flow of the process of the image compression apparatus according to the fourth embodiment.

The flow of the process of this image compression apparatus 5 is shown in FIG. 15. First, the controller 11 initializes the encryption unit 18, and requests the generation of a key and a key ID to the key management system 20. Incidentally, the key management system 20 normally exists outside the image compression apparatus 5. The key management system 20 supplies the key to the encryption unit 18 according to this request, and supplies the key ID to the controller 11. The controller 11 supplies the key ID to the file header generator 12. The file header generator 12 temporarily generates a file header, and records the format decided at this time point and the information regarding the other JPEG200 system. In this case, the file header generator 12 records the key ID in "Cryptographic key id" defined in "Crypto context" in the header metadata.

Thereafter, the encoder 10 sequentially encodes each frame of the input moving image signal. The encryption unit 18 encrypts the generated encoded code stream. The file body generator 13 records, for example, the encoded code stream each time the encoding and encrypting of one frame are finished. The file header generator 12 updates the values of the "Stream offset" in the index table to describe the size information of the encoded code stream. When the encoding of all the frames is finished, the file header generator 12 determines the file header. The MXF generator 14 generates the final MXF file, and outputs it. Incidentally, the file header may be updated not for each frame but for predetermined number of frames, similar to the first embodiment.

As described above, according to the embodiment, the image compression apparatus 5 can compression-encode the input moving image signal according to the JPEG2000 system, further encrypt the obtained encoded code stream, record it in the MXF file, and output the encoded code stream. Particularly, the encoded code stream is encrypted. Thus, the contents of the image can be effectively protected.

Incidentally, even in the fourth embodiment, a storage unit is provided similar to the second embodiment. The value of the "Stream offset" of each frame may be stored until the encoding of all the frames is finished. Further, a file header corrector or a storage updating unit is provided similarly to the third embodiment. After the encoding of the input moving image signal, only part of the midway frame or all frames from the midway frame may be re-encoded.

As described above, the best mode for carrying out the present invention has been described. However, the present invention is not limited only to the above-mentioned embodiments. Various modifications are possible within the scope of the present invention.

For example, in the above-mentioned embodiments, it has been described that each frame constituting the input moving image signal is compression-encoded according to the JPEG2000 system, the encoded code stream is generated for each frame and each encoded code stream is recorded in a file body in the MXF file. However, the image compression system is not limited only to the JPEG2000 system, and the file for recording the encoded code stream is not limited to the MXF file.

Further, in the above-mentioned embodiments, it has been described that the series of the processes are executed by hardware. However, the series of the processes may be executed by software. In this case, the image compression apparatus is constituted by a computer shown in FIG. 16.

Figure 16:
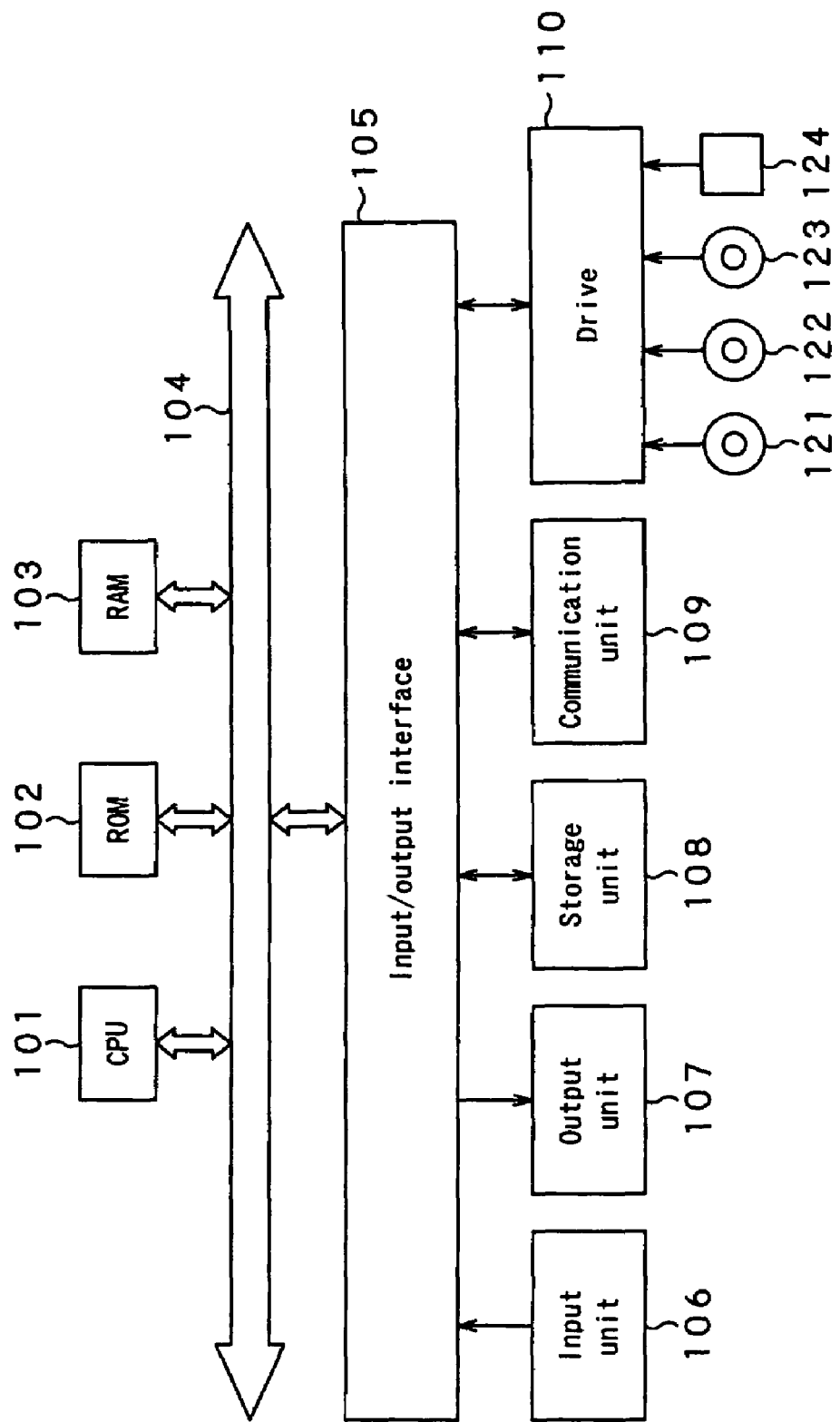
FIG. 16 is a view showing a schematic configuration of a computer as the image compression apparatus.

The computer 100 shown in FIG. 16 includes at least a CPU (Central Processing Unit) 101, a ROM (Read Only Memory) 102, a RAM (Random Access Memory) 103, and a drive 110. The CPU 101 executes the various type processes according to a program stored in the ROM 102 or a program loaded from the storage unit 108 to the RAM 103. In the RAM 103, data and the like necessary when the CPU 101 executes the various processes are suitably stored.

The CPU 101, the ROM 102 and the RAM 103 are connected mutually through a bus 104. The input/output interface 105 is also connected to this bus 104.

To the input/output interface 105, an input unit 106 such as a keyboard and a mouse, a display such as a CRT (Cathode Ray Tube) and an LCD (Liquid Crystal Display), an output unit 107 such as a speaker, a storage unit 108 such as a hard disc, a communication unit 109 such as a modem and a terminal adapter, are connected. The communication unit 109 performs the communication process through a network including the Internet.

To the input/output interface 105, a drive 110 is connected as needed. A magnetic disc 121, an optical disc 122, a magneto-optic disc 123, a semiconductor memory 124, or the like are suitably mounted. The programs read from them are installed in the storage unit 108 as needed.

When the above-mentioned series of the processes are executed by the software, the program for configuring the software is installed in a computer built in a dedicated hardware, or in a general-purpose personal computer, for example, that can execute various functions by installing various types of programs, through the network or from a recoding medium.

As shown in FIG. 15, the recording medium is constituted, separately from a device body, by not only a package media such as a magnetic disc 121 (including FD (Flexible Disc)), an optical disc 122 (including CD-ROM (Compact Disc-Read Only Memory), a DVD (Digital Versatile Disc), a magneto-optic disc 123 (including MD (Mini Disc; registered trademark) or a semiconductor memory 124 to be distributed to provide a program to a user and storing a program, but also a ROM 102 recording a program, or a hard disc included in the storage unit 108, which are provided to the user in the state previously built in the device body.

It should be understood by those skilled in the art that various modifications, combinations, sub-combinations and alternations may occur depending on design requirements and other factors insofar as they are within the scope of the appended claims or the equivalents thereof.

What is claimed is:

1. An image compression apparatus comprising:
encoding means for compression-encoding each frame constituting an input moving image signal according to a JPEG2000 system to generate an encoded code stream for each frame;
file header generating means for temporarily generating a file header of the MXF (material exchange format) and recording at least information for identifying a JPEG2000 system and size information of each encoded code stream generated by the encoding means in the file header;
file body generating means for recording each encoded code stream generated by the encoding means in the file body of the MXF; and
file generating means for generating an MXF file at least from the data recorded in the file header and the data recorded in the file body.

2. The image compression apparatus according to claim 1, wherein the file header generating means records size information of each generated encoded code stream in the file header each time the encoded code stream for one frame or predetermined number of frames is generated, and updates the file header.

3. The image compression apparatus according to claim 1, further comprising:
recording means for recording the size information of each encoded code stream generated by the encoding means, wherein
the file header generating means records size information recorded in the recording means in the file header when the size information of the encoded code streams for all the frames is recorded in the recording means.

4. The image compression apparatus according to claim 1, wherein the file header generating means describes the size information of each encoded code stream using a sample offset in an index table of the file header.

5. The image compression apparatus according to claim 1, wherein the file header generating means describes the information for identifying the JPEG2000 system using a MXF Generic Picture Essence Descriptor in the header metadata of the file header.

6. The image compression apparatus according to claim 1, wherein
the coding means generates a plurality of encoded code streams which can be reproduced in a plurality of different resolutions for each frame constituting the input moving image signal, and
the file generating means generates a plurality of MXF files corresponding to the plurality of the encoded code streams.

7. The image compression apparatus according to claim 6, wherein the encoding means generates an encoded code stream constituted by only a low frequency subband and an encoded code stream constituted by all subbands for each frame constituting the input moving image signal.

8. The image compression apparatus according to claim 6, wherein the encoding means generates an encoded code stream constituted by only a low frequency subband and an encoded code stream constituted by a subband except the subband of low frequency for each frame constituting the input moving image.

9. The image compression apparatus according to claim 1, further comprising:
encryption means for encrypting each encoded code stream generated by the encoding means, wherein
the file body generating means records an encoded code stream encrypted by the encryption means in the file body.

10. The image compression apparatus according to claim 9, wherein the file header generating means describes an identifier of a key used for encryption by using a cryptographic key ID defined by a crypto context in the header metadata of the file header.

11. An image compression method, implemented on an image compression apparatus, comprising:
an encoding step, performed at the image compression apparatus, of compression-encoding each frame that constitutes an input moving image signal according to the JPEG2000 system to generate an encoding code stream for each frame;

a file header generating step, performed at the image compression apparatus, of temporarily generating a file header of the MXF and recording at least information for identifying the JPEG2000 system and size information of each encoded code stream generated by the encoding step in the file header;

a file body generating step, performed at the image compression apparatus, of recording each encoded code stream generated in the encoding step in the file body of the MXF; and a file generating step, performed at the image compression apparatus, of generating the MXF file at least from the data recorded in the file header and the data recorded in the file body.

12. A computer-readable recording medium encoding with computer executable instructions, which when executed by a computer, cause the computer to execute a predetermined process, comprising:

an encoding step performed at the computer, of compression-encoding each frame constituting an input moving image signal according to the JPEG2000 system to generate an encoded code stream;

a file header generating step, performed at the computer, of temporarily generating a file heater of the MXF and recording at least information for identifying the JPEG2000 system and size information of each encoded code stream generated by the encoding step in the file header;

a file body generating step, performed at the computer, of recording each encoded code stream generated in the encoding step in the file body of the MXF; and a file generating step, performed at the computer, of generating the MXF file at least from the data recorded in the file header and the data recorded in the file body.

13. An image compression apparatus comprising:

encoding means for generating an encoded code stream for each frame by compression-encoding each frame constituting an input moving image signal;

file header generating means for temporarily generating a file header included in a file for recording the encoded code stream and recording at least information for identifying a compression encoding system and size information of each encoded code stream generated by the encoding means in the file header;

file body generating means for recording each encoded code stream generated by the encoding means in a file body included in the file; and file generating means for generating the file from the data recorded in the file header and the data recorded in the file body.

14. The image compression apparatus according to claim 13, wherein the file header generating means records the size information of each generated encoded code stream in the file header each time the encoded code stream for one frame or predetermined number of frames is generated and updates the file header.

15. The image compression apparatus according to claim 13, further comprising:

recording means for recording size information of each encoded code stream generated by the encoding means, wherein the file header generating means records the size information recorded in the recording means in the file header when the size information of the encoded code stream for all the frames is recorded in the recording means.

16. The image compression apparatus according to claim 13, wherein the encoding means generates a plurality of encoded code streams which can be reproduced in a plurality of different resolutions for each frame constituting the input moving image signal, and the file generating means generates a plurality of files corresponding to the plurality of the encoded code streams.

17. The image compression apparatus according to claim 16, wherein the encoding means generates an encoded code stream constituted by only a subband of low frequency and an encoded code stream constituted by all sub-bands for each frame that constitutes the input moving image signal.

18. The image compression apparatus according to claim 16, wherein the encoding means generates an encoded code stream constituted by only a subband of low frequency and an encoded code stream constituted by a subband except the subband of low frequency for each frame that constitutes the input moving image signal.

19. The image compression apparatus according to claim 13, further comprising:

encryption means for encrypting each encoded code stream generated by the encoding means, wherein the file body generating means records an encoded code stream encrypted by the encryption means in the file body.

20. An image compression method, implemented on an image compression apparatus, comprising:

an encoding step, performed at the image compression apparatus, of generating an encoded code stream for each frame by compression-encoding each frame constituting an input moving image signal;

a file header generating step, performed at the image compression apparatus, of temporarily generating a file header included in a file for recording the encoded code stream and recording at least information for identifying a compression encoding system and size information of each encoded code stream generated by the encoding means in the file header;

a file body generating step, performed at the image compression apparatus, of recording each encoded code stream generated by the encoding step in a file body included in the file; and a file generating step, performed at the image compression apparatus, of generating the file from the data recorded in the file header and the data recorded in the file body.

21. A computer-readable recording medium encoded with computer executable instructions, which when executed by a computer, cause the computer to execute a predetermined process, comprising:

an encoding step, performed at the computer, of generating an encoded code stream for each frame by compression-encoding each frame constituting an input moving image signal;

a file header generating step, performed at the computer, of temporarily generating a file header included in a file for recording the encoded code stream and recording at least information for identifying a compression encoding system and size information of each encoded code stream generated by the encoding step in the file header;

a file body generating step, performed at the computer, of recording each encoded code stream generated by the encoding step in a file body included in the file; and a file generating step, performed at the computer, of generating the file from the data recorded in the file header and the data recorded in the file body.

22. An image compression apparatus comprising:

an encoding unit that compression-encodes each frame constituting an input moving image signal according to a JPEG2000 system to generate an encoded code stream for each frame;

a file header generating unit that temporarily generates a file header of the MXF and records at least information for identifying a JPEG2000 system and size information of each encoded code stream generated by the encoding unit in the file header;

a file body generating unit that records each encoded code stream generated by the encoding unit in the file body of the MXF; and a file generating unit that generates an MXF file at least from the data recorded in the file header and the data recorded in the file body.

23. An image compression apparatus comprising:

an encoding unit that generates an encoded code stream for each frame by compression-encoding each frame constituting an input moving image signal;

a file header generating unit that temporarily generates a file header included in a file for recording the encoded code stream and records at least information for identifying a compression encoding system and size information of each encoded code stream generated by the encoding unit in the file header, a file body generating unit that records each encoded code stream generated by the encoding unit in a file body included in the file; and a file generating unit that generates the file from the data recorded in the file header and the data recorded in the file body.

* * * * *